Patented Aug. 11, 1931

1,818,579

UNITED STATES PATENT OFFICE

GEORG PFLEIDERER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ELECTRODE

No Drawing. Application filed October 21, 1924, Serial No. 745,016, and in Germany November 1, 1923.

This invention relates to an electrode for electrolytic cells particularly those serving for decomposition of water and having an alkaline electrolyte, for which cells, as a rule iron, sometimes nickel or nickel plated iron, are used as electrode metals, at least for the cathodic electrode.

I have found that the cell tension can be considerably lowered and the output calculated on energy in the same ratio improved by employing sulfurized electrodes. The term "sulfurized" is to be understood in a broad sense comprising for example electrodes made of metal containing sulfur, or subjecting ordinary metal electrodes to treatment with a substantial amount of sulfur in order to produce a surface of sulfurized metal, or the metal containing sulfur may be subsequently more or less desulfurized, at least superficially. In the latter case the increased usefulness of the electrode remains intact or may be even still more improved. It is to be understood that the sulfur referred to above is present in the electrodes neither in the form of slime on their surface nor in the form of a uniform layer consisting solely of metal sulfide, but in a form which I call metal containing sulfur and which may be an alloy the nature of which could not be exactly ascertained.

The new electrode produces particular advantages when employed as cathode but when using it as anode advantages are also observed. I lay no claim to anodes consisting of iron polysulfid, or of iron coated therewith, and the appended claims should be read with this limitation. For example, with the electrode aforedescribed overvoltage of the cathodic development of hydrogen is far lower than with the usual electrodes and is very nearly that with platinized platinum.

Generally it is sufficient to have the surface of the electrode sulfurized. For example a sulfur containing layer may be produced on the electrode metal preferably nickel or cobalt alone or nickel (cobalt) steel by acting on it with chemical agents capable of giving off sulfur or by the action of vaporized sulfur at an elevated temperature. Sulfur may also be precipitated onto the surfaces of the electrode by electrolysis, for example an iron electrode may be coated with a sulfur-containing nickel, cobalt, iron or mixtures of such metals by electrodeposition. This may be done by adding to the galvanic bath containing salts of the aforesaid metals, compounds capable of depositing sulfur, for instance a thiosulfate or thiosulfuric acid. Subsequent desulfurizing may be done by electrolytic treatment, for example by using the electrode as a cathode in an alkaline solution for a length of time. Sulfurized electrodes are also gradually desulfurized when used in electrolytic cells for the decomposition of water.

For example, an iron electrode and a nickel, or nickel plated, or nickelsteel, electrode are galvanically treated for 3 hours with a current density of 0.003 ampere per square centimetre at a temperature of about 30 degrees centigrade in a bath containing a nickel salt, for instance, 5 per cent of nickel sulfate and 10 per cent of sodium thiosulfate, making the iron electrode the cathode, and the nickel, or nickel plated, or nickel steel electrode the anode. A sulfur-containing layer of nickel is deposited on the iron cathode and the anode also takes up sulfur on its surface. Sulfurization takes place also when the bath does not contain any nickel sulfate of other heavy metal salt, but only a thiosulfate or the like. Electrodes treated in this manner can be used with advantage as cathodes as well as anodes for the decomposition of alkaline solutions, the tension being for example, under comparative conditions, between a normal electrode and a cathode consisting of ordinary nickel sheet 1,350 volts, and of sulfurized nickel sheet 1,075 volts and with the latter treated as a cathode for 16 days in caustic soda lye with the result of losing 3 milligrammes of sulfur for each square cm. of surface=1,010 volts.

In any case when the term "sulfurized" or "sulfur" is employed in the above disclosure it is meant to comprise by such terms also the cognates of sulfur namely selenium and tellurium as equivalents of sulfur substituting the sulfur either wholly or in part.

What I claim is:

1. The process of producing an electrode for the electrolytic decomposition of water and manufacture of hydrogen which comprises electrolytically preparing a metal electrode, of which at least the surface is sulfurized, and then superficially desulfurizing the electrode.

2. The process of producing an electrode for the electrolytic decomposition of water and manufacture of hydrogen which comprises preparing a metal electrode, of which at least the surface is sulfurized, and then superficially desulfurizing the electrode by exposing it for some time to the action of an electric current in an alkaline bath.

3. The process of producing hydrogen which comprises electrolyzing an aqueous medium between electrodes at least one of which consists at least superficially of a sulphurized metal.

4. The process of producing hydrogen which comprises electrolyzing an aqueous medium between electrodes at least one of which is electroplated with a metal of the iron group (i. e. iron, nickel and cobalt) containing sulphur.

5. The process of producing hydrogen which comprises electrolyzing an aqueous medium between electrodes at least one of which is electroplated with a mixture of metals of the iron group (i. e. iron, nickel and cobalt) containing sulphur.

6. The process of producing hydrogen which comprises electrolyzing an aqueous medium between electrodes at least one of which consists at least superficially of a sulphurized metal which has been superficially desulphurized.

7. An electrode for the electrolytic production of hydrogen and oxygen from an alkaline electrolyte, comprising a metal base free from sulphur and having on its surface a metal containing sulphur.

8. An electrode for the electrolytic production of hydrogen and oxygen from an alkaline electrolyte, comprising a metal base free from sulphur and having on its surface a metal of the iron group containing sulphur.

9. An electrode for the electrolytic production of hydrogen and oxygen from an alkaline electrolyte, comprising a metal base free from sulphur and having on its surface a mixture of the metals of the iron group containing sulphur.

10. An electrode for the electrolytic production of hydrogen and oxygen from an alkaline electrolyte, comprising a metal base having a surface of nickel containing sulphur.

In testimony whereof I have hereunto set my hand.

GEORG PFLEIDERER.